United States Patent

Fessmann

[11] Patent Number: 5,910,330
[45] Date of Patent: Jun. 8, 1999

[54] PROCESS AND APPARATUS FOR SMOKING FOODSTUFFS

[75] Inventor: Klaus-Dieter Fessmann, Remshalden, Germany

[73] Assignee: Germos-Fessmann GmbH & Co. KG, Germany

[21] Appl. No.: 08/886,985

[22] Filed: Jul. 2, 1997

[30] Foreign Application Priority Data

Jul. 11, 1996 [DE] Germany .......................... 196 27 227

[51] Int. Cl.[6] ........................................................ A21D 4/00
[52] U.S. Cl. .................. 426/314; 426/321; 426/332; 426/474; 426/442; 99/468; 99/472; 99/473
[58] Field of Search .................... 426/314, 321, 426/332, 474, 442; 99/468, 472, 473

[56] References Cited

U.S. PATENT DOCUMENTS

| | | | |
|---|---|---|---|
| 3,643,587 | 2/1972 | Harrington et al. | 99/261 |
| 3,873,741 | 3/1975 | Melcer et al. | 426/221 |
| 3,877,361 | 4/1975 | Trainor et al. | 99/478 |
| 3,969,996 | 7/1976 | Huang et al. | 99/476 |
| 4,532,141 | 7/1985 | Chiu | 426/250 |
| 4,532,858 | 8/1985 | Hershfeld | 99/534 |
| 5,225,596 | 7/1993 | Fessmann | 99/477 |
| 5,662,959 | 9/1997 | Tippmann | 426/641 |

Primary Examiner—Nina Bhat

[57] ABSTRACT

A process for combined smoking and cooking of foodstuffs involves feeding a mixture of superheated steam and liquid smoke vapor into a treating medium which is circulated in a treatment chamber. The mixture is produced by an arrangement of mixing nozzles that are connected to a superheated steam duct and a liquid smoke duct.

11 Claims, 2 Drawing Sheets

PROCESS AND APPARATUS FOR SMOKING FOODSTUFFS

BACKGROUND TO THE INVENTION

The invention relates to a process for smoking foodstuffs and to an apparatus for carrying out the process.

FR-A-2201038 discloses a process for smoking foodstuffs, in which a treating medium is circulated through a treatment chamber, to which treating medium there is added during circulation liquid smoke. In that process, smoking of the foodstuffs is effected in that finely divided droplets of liquid smoke are fed into the treating medium (air) circulated through the treatment chamber, the droplets optionally being evaporated on a heated surface.

In another known smoking process, liquid smoke is atomized in the treatment chamber using compressed air. In that process, circulation of the treating medium is interrupted for the duration of the atomization.

DE-A-4234656 discloses a smoking process in which liquid smoke is sprayed directly into the intake nozzle of a fan with which the treating medium is circulated in the treatment chamber.

The known processes are not completely satisfactory as regards the uniformity, the colour quality and colour stability and occasionally as regards the taste of the products. In so far as separate heating surfaces are arranged in the path of the circulated treating medium (generally predominantly air), these are susceptible to contamination, wear and tear and faults.

Furthermore, a common factor of the known processes is that the total manufacturing time for foodstuffs smoked with liquid smoke is comparatively long, since the smoking and an additionally necessary cooking or cooking until done of the foodstuffs is effected in two successive treatment steps.

SUMMARY OF THE INVENTION

The present invention provides a process for smoking foodstuffs by means of liquid smoke, which on the one hand ensures good uniformity, satisfactory colour quality and colour stability and also a pleasing taste of the foodstuffs, but at the same time also allows a faster total manufacturing time for the foodstuffs.

Accordingly, the invention provides a process for smoking foodstuffs located in a treatment chamber, which comprises:

(a) supplying to the treatment chamber a treating medium which comprises mixture of superheated steam and liquid smoke vapour, and (b) supplying to the treatment chamber a treating medium which consists of at least one of superheated steam, hot air and moist air.

In the process according to the invention, the spraying and evaporation of the liquid smoke and mixing thereof with superheated steam will generally occur simultaneously. In this manner a very effective and homogeneous distribution of the liquid smoke in the treating medium is ensured.

The mixture of superheated steam and liquid smoke vapour carries heat into the treating medium.

In the first treatment phase, in which the foodstuffs introduced into the treatment chamber are colder than the treating medium, the liquid smoke condenses on the foodstuffs, so that these come into intimate and very uniform contact with the liquid smoke.

The foodstuffs are increasingly heated during the course of the smoking carried out in this manner. In a second treatment phase, plain superheated steam is supplied to the circulated treating medium. In this treatment phase the liquid smoke vapour is in equilibrium, since the temperature of the foodstuffs no longer differs markedly from that of the treating medium. In this second treatment phase, the foodstuffs are then at the same time cooked until done.

In the process according to the invention, smoking, gentle cooking and/or cooking are therefore combined, and resting periods are unnecessary. As a result, the total manufacturing time of the smoked foodstuffs is also shortened.

Any liquid smoke still remaining in the installation during the first phase is fully used in the second phase and condensed on the foodstuffs.

Since plain superheated steam is supplied to the treating medium in the second treatment phase, self-cleaning of the installation in the second treatment phase is achieved.

Preferably, the method includes the step of producing the mixture of superheated steam and liquid smoke vapour by mixing superheated steam and liquid-form liquid smoke together in a one nozzle.

Preferably, the pressure of the superheated steam supplied to the nozzle is from about 2 to about 6 bars, preferably about 4 bars.

Preferably, the pressure of the liquid-form liquid smoke supplied to the nozzle is from 2 to about 10 bars, preferably about 6 bars.

In another aspect, the invention provides apparatus for smoking foodstuffs located in a treatment chamber by a process which involves (i) supplying to the treatment chamber a treating medium which comprises mixture of superheated steam and liquid smoke vapour, and then (ii) supplying to the treatment chamber a treating medium which consists of at least one of superheated steam, hot air and moist air, the apparatus comprising:

(a) a treatment chamber having a treatment chamber inlet and a treatment chamber outlet for the treatment medium, (b) a fan for circulating the treating medium through the treatment chamber, the fan having a fan inlet, and (c) a mixing chamber having a mixing chamber inlet and a mixing chamber outlet, the mixing chamber being located outside the treatment chamber and being connected by the mixing chamber inlet to the treatment chamber outlet (preferably a ceiling outlet), and by the mixing chamber outlet to the fan inlet, the mixing chamber having:

(i) ducts for the superheated steam and the liquid smoke, (ii) at least one mixing nozzle for mixing together the superheated steam and the liquid smoke received from the said ducts, to form the mixture of superheated steam and liquid smoke vapour.

Preferably, the apparatus includes a heating device located in the mixing chamber, the heating device being located upstream of the mixing nozzles.

Preferably, the apparatus includes separate first and second control valves, and the mixing chamber has a plurality of mixing nozzles, the mixing nozzles being connected by way of respective ones of the first control valves to the superheated steam duct and by way of respective ones of the second control valves to the liquid smoke duct.

Preferably, the mixing nozzles are distributed over a region of the mixing chamber corresponding to the cross-section of the fan inlet.

Preferably, the apparatus includes an adjustable pressure reducer by which the superheated steam duct is connected to the mixing nozzles.

INTRODUCTION TO THE DRAWINGS

FIG. 1 is a diagrammatic illustration of an arrangement for smoking and cooking sausages or similar foodstuffs; and FIG. 2 is a section through a mixing nozzle used in the arrangement according to FIG. 1.

DESCRIPTION OF PREFERRED EMBODIMENTS

Figure 1:
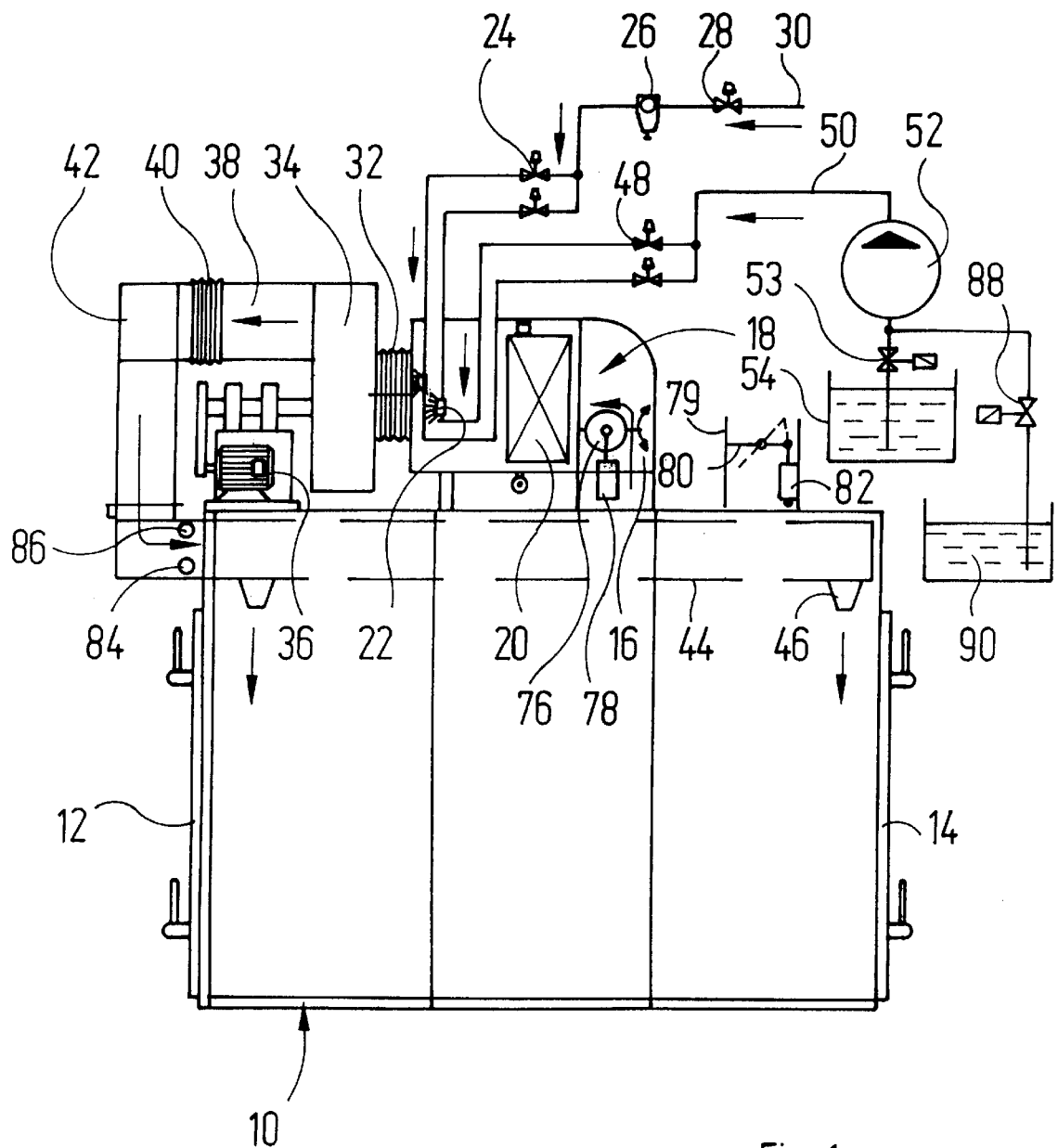

In the drawings, the reference number 10 refers generally to a treatment chamber which is equipped on the intake side with doors 12 and on the delivery side with doors 14, through which racks carrying sausages or other foodstuffs are loaded into and unloaded from the treatment chamber.

Connected to a ceiling outlet of the treatment chamber 10 is an inlet nozzle 16 of a mixing chamber 18. That chamber contains a heating element 20 and, arranged downstream of the same, one or more mixing nozzles 22, in the embodiment shown, two mixing nozzles. The latter serve to mix superheated steam with liquid smoke. The mixing nozzles 22 are connected by way of first electromagnetic valves 24 and a pressure reducer 26 and also an electromagnetic valve 28 to a superheated steam duct 30. The superheated steam in the superheated steam duct 30 is typically under a pressure of 6 to 10 bars and has a corresponding temperature of up to 108° C. The pressure of the superheated steam after the pressure reducer 26 is typically about 4 bars.

The mixing nozzles 22 are arranged upstream of a bellows 32 which in its turn is connected to the inlet of a fan 34; the mixing nozzles are distributed in the mixing chamber over a region which aligns axially with the inlet of the fan. The latter is driven by an electric motor 36. An outlet connection 38 of the fan 34 is connected by way of a bellows 40 and a diverter duct 42 to two lateral distributor shafts 44 which extend below the ceiling wall through the treatment chamber 10. Each distributor shaft 44 carries a plurality of delivery nozzles 46 through which the treating medium is admitted into the interior of the treatment chamber.

The mixing nozzles 22 are connected by their second inputs by way of second electromagnetic valves 48 to a liquid smoke duct 50. Liquid smoke in liquid form is admitted to this duct by a pressure pump 52 which draws the liquid smoke from a liquid smoke supply tank 54 by way of an electromagnetic valve 53. The pressure of the liquid-form liquid smoke at the inlet of the mixing nozzles 22 is preferably set to about 6 bars.

Instead of being supplied through the pressure pump 52, liquid smoke can alternatively be extracted from the supply tank 54 by causing compressed air to act thereon.

The treatment chamber described above is operated as follows: after the chamber has been loaded with fresh sausages, the fan 34 is switched on and the foods are typically reddened and/or dried. For smoking, the electromagnetic valves 24, 28 and 48 are actuated. A mixture of superheated steam and liquid smoke vapour is consequently supplied from the mixing nozzles 22, and is added to the air being circulated by the fan 34. The air thus has a high moisture content and is simultaneously heated by the superheated steam being supplied. As it wafts past the sausages introduced into the treatment chamber, liquid smoke condenses on the sausages which thus absorb the smoke flavour and are heated up at the same time.

Once an amount of liquid smoke sufficient to establish the taste of the products has been introduced in this manner into the treating medium, then the electromagnetic valves 48 are closed, but the electromagnetic valves 24 and 28 remain open. The superheated steam that continues to flow in cleans the mixing nozzles 22 and the parts of the arrangement which they discharge directly onto. The superheated steam that continues to be given off leads to further temperature increase in the treating medium. In this second treatment phase the sausages or other products are brought to a substantially constant cooking temperature which is maintained for a period sufficient for cooking until done.

In this second treatment phase, no appreciable condensing of liquid smoke on the surfaces of the products takes place, but the products remain in a hot treating medium which contains liquid smoke vapour.

After the cooking time has elapsed, the admission of superheated steam is then discontinued and—if this has not already been done—the heating element 20 is switched off.

From the above description the following features and advantages of the described combined smoking and cooking arrangement are apparent:

(a) The admission of superheated steam and liquid smoke is effected at a common point in the circulation of the treating medium and in a common component, which is externally attached to the treatment chamber.

(b) After of the said external component, the mixture of superheated steam and liquid smoke is fully ready for use. No further preparation is required.

(c) During the introduction of the liquid smoke, circulation of the treating medium through the treatment chamber can continue The products are therefore very uniformly treated.

(d) Smoking and cooking of the products is effected in a single treating cycle; this cycle does contain two different treatment phases as regards the addition of liquid smoke, but for the rest represents a combined cycle as regards the circulation of the treating medium having a high moisture content and the temperature management.

(e) Since the conditioning of the treating medium is effected in an external component of the arrangement, it is also possible for existing installations to be adapted subsequently in a simple manner for the process according to the invention.

(f) As regards the reduction of emissions, the known installations can continue to be used.

(g) By mixing superheated steam and liquid smoke, a very uniform distribution of the liquid smoke is obtained, and the treating medium is heated. Both factors promote a rapid colour change and a high colour stability of the products.

(h) In the first treatment phase, transfer of liquid smoke to the products is effected by condensation. This ensures that the products are treated very uniformly with liquid smoke.

(i) The temperature and the moisture content of the treating medium effect a quicker treatment of the products, resulting in a reduction in the overall manufacturing time.

(j) Because of the very fine distribution of the liquid smoke in the treating medium, losses which are attributable to droplet formation of liquid smoke and falling of these droplets to the bottom of the treatment chamber are minimal.

(k) Varying the pressure of the superheated steam, the amount of superheated steam added, the amount of liquid smoke added, the duration of the treatment phases and the temperature of the treating medium allows an infinite number of possible influencing factors for the introduction of specific qualitative features of the products.

(l) The operating parameters which are used in the above-described smoking and cooking arrangement and in the above-described smoking and cooking process for foodstuffs can be set so that they are easily reproducible. The process requires no mechanically complicated and temperamental system parts.

Figure 2:
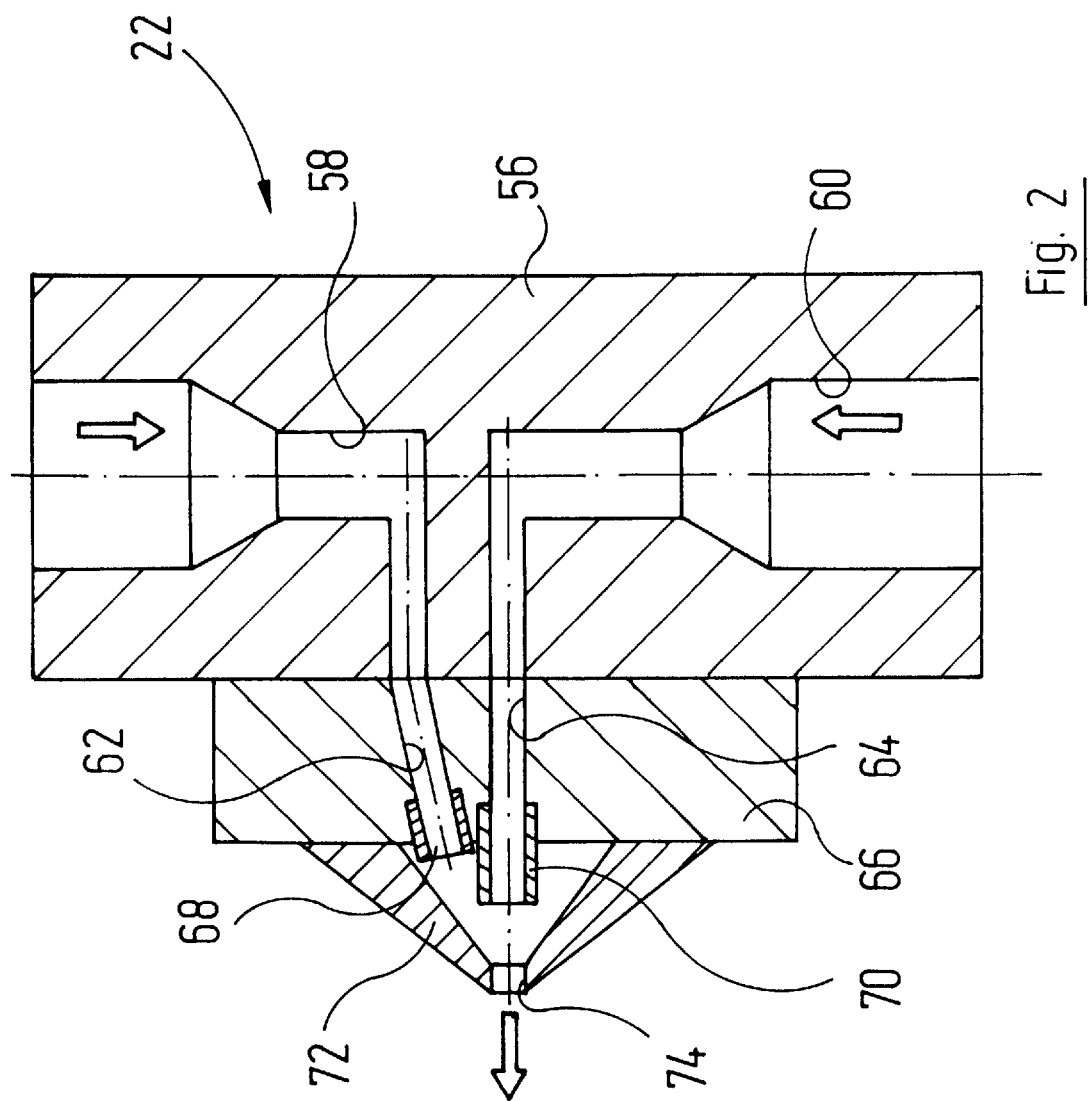

The mixing nozzle 22 can have the construction illustrated in detail in FIG. 2:

An angled steam inlet duct 58 and an angled liquid smoke inlet duct 60 are provided in a base block 56. These ducts are in connection with a steam duct 62 and a liquid smoke duct 64 respectively of a nozzle base plate 66. Here, the liquid smoke duct 64 runs perpendicular to the plane of the nozzle base plate 66, whilst the axis of the steam duct 62 forms an angle of about 72° with the plane of the nozzle plate 66.

The end of the steam duct 62 carries, in alignment, a steam nozzle 68, the end of the liquid smoke duct 64 carries an liquid smoke nozzle 70.

Arranged on the nozzle base plate 66 is a hollow, conical mixing nozzle cap 72, the outer surface of which has a tapering opening angle of about 105° and the inner surface of which has a tapering opening angle of about 78°. A mixing nozzle opening 74 which aligns axially with the liquid smoke nozzle 70 is provided at the tip of the mixing nozzle cap 72. Furthermore, the angle at which the steam nozzle 68 is set is coordinated with the position of the mixing nozzle opening 74 so that the axes of steam nozzle 68 and liquid smoke nozzle 70 intersect there.

In the exemplary embodiment described above, a practical application was considered in which sausages or other meat products were smoked in a first treatment phase and cooked and/or cooked until done in a second treatment phase.

As a modification, a phase in which the products to be treated are treated with air having an adjusted moisture content and/or with hot air can be selected as the second treatment phase.

For that purpose, as also illustrated in FIG. 1, in the wall of the mixing chamber 18 there is provided a rotatable butterfly valve 76 via which the chamber interior can be connected to the ambient atmosphere. To adjust this butterfly valve between a closed position reproduced in the drawing and a more or less opened position, a servomotor 78 is provided.

An outlet nozzle 79 is provided on the ceiling wall of the housing 10, in which nozzle there is arranged a rotatable butterfly valve 80 which is movable from a closed position, reproduced in the drawing, to a more or less opened position, one such position being indicated in FIG. 1 by a broken line. A further servomotor 82 is used to adjust the butterfly valve 80.

The servo motors can, as shown, be working cylinders, especially compressed air cylinders or even rotary actuators, for example, stepper motors.

If it is desirable to carry out a second treatment phase with the arrangement thus modified, in which the products are treated with dry, hot air, then the procedure is as follows:

The butterfly valve 76 is opened by the servomotor 78, and at the same time the butterfly valve 80 is opened by the servomotor 82. A proportion of the circulated air is thus constantly extracted by the fan 34 via the butterfly valve 80 whilst a corresponding amount of fresh air is drawn in from the environment via the butterfly valve 76. In this manner the moisture content of the circulated gaseous mixture decreases. At the same time, the circulated air is heated to the desired temperature by using the heating element 20.

Control of the heating element 20 and control of the butterfly valves 76, 80 can be effected using a temperature sensor 84 and a moisture sensor 86 respectively, the sensors being provided at the inlet to the treatment chamber, for example at the end of the diverter duct 42, the butterfly valves 76, 80 being increasingly closed commensurate with the desired low moisture content that has been reached.

In a further type of treatment for products to be smoked, the second treatment phase comprises a treatment with cool air of a set humidity.

The necessary lowering of the moisture content is effected as described above.

An increase in humidity can be achieved, for example, by adding superheated steam or even by generating water vapour through the use of a relatively small amount of superheated steam in the mixing nozzles 22. For that purpose, water instead of liquid-form liquid smoke is supplied to the mixing nozzles 22. This can be effected by using the pressure pump 52 which is arranged to be connected on the intake side by way of an electromagnetic valve 99 to a supply tank 90 for water.

By appropriate control of the electromagnetic valves 53 and 88, there is a choice of liquid-form liquid smoke and/or water for introduction via the mixing nozzles 22 into the circulated mixture, wherein the amounts delivered can be determined by the valve opening times (pulse modulation).

What is claimed is:

1. A process for smoking foodstuffs located in a treatment chamber, which comprises:
    (a) supplying to the treatment chamber a treating medium which comprises a mixture of superheated steam and liquid-form smoke vapour,
    (b) supplying to the treatment chamber a second medium which includes at least one of superheated steam, hot air and moist air, and
    (c) producing the mixture of superheated steam and liquid smoke vapour by mixing super heated steam and liquid-form liquid smoke together in at least one nozzle, the pressure of the superheated steam supplied to the nozzle being from about 2 to about 6 bars and the pressure of the liquid-form liquid smoke supplied to the nozzle being from about 2 to about 10 bars.

2. A process as claimed in claim 1, in which the pressure of the superheated steam supplied to the nozzle is about 4 bars.

3. A process as claimed in claim 1, in which the pressure of the liquid-form liquid smoke supplied to the nozzle is about 6 bars.

4. A process as claimed in claim 1, which includes the step of circulating the treating medium through the treatment chamber.

5. A process as claimed in claim 1, wherein superheated steam and liquid smoke are mixed in a mixing chamber located outside the treatment chamber and having at least one mixing nozzle for mixing together the superheated steam and the liquid smoke.

6. A process as claimed in claim 5, including the step of heating the treatment medium in the mixing chamber upstream of the mixing nozzles.

7. Apparatus for smoking foodstuffs located in a treatment chamber by a process which involves (i) supplying to the treatment chamber a treating medium which comprises mixture of superheated steam and liquid smoke vapour, and then (ii) supplying to the treatment chamber a treating medium which consists of at least one of superheated steam, hot air and moist air, the apparatus comprising:

(a) a treatment chamber having a treatment chamber outlet for the treatment medium, (b) a fan for circulating the treating medium through the treatment chamber, the fan having a fan inlet, and (c) a mixing chamber having a mixing chamber inlet connected to the treatment chamber outlet and a mixing chamber outlet connected to the fan inlet, the mixing chamber being located outside the treatment chamber and having:

(i) ducts for the superheated steam and the liquid smoke, (ii) at least one mixing nozzle for mixing together the superheated steam and the liquid smoke received from the said ducts, to form the mixture of superheated steam and liquid smoke vapour.

8. Apparatus according to claim 7, which includes a heating device which is located in the mixing chamber and upstream of the mixing nozzles.

9. Apparatus according to claim 7, which includes separate first and second control valves and in which the mixing chamber has a plurality of mixing nozzles, the mixing nozzles being connected by way of respective ones of the first control valves to the superheated steam duct and by way of respective ones of the second control valves to the liquid smoke duct.

10. Apparatus according to claim 9, in which the mixing nozzles are distributed over a region of the mixing chamber corresponding to the cross-section of the fan inlet.

11. Apparatus according to claim 7, which includes an adjustable pressure reducer by which the superheated steam duct is connected to the mixing nozzles.

* * * * *